(12) United States Patent
Mill

(10) Patent No.: US 9,688,165 B2
(45) Date of Patent: Jun. 27, 2017

(54) SEAT ASSEMBLY FOR A VEHICLE

(71) Applicant: FRANZ KIEL GMBH, Noerdlingen (DE)

(72) Inventor: Jürgen Mill, Ellwangen (DE)

(73) Assignee: Franz Kiel GMBH, Noerdlingen (DE)

( * ) Notice: Subject to any disclaimer, the term of this patent is extended or adjusted under 35 U.S.C. 154(b) by 27 days.

(21) Appl. No.: 14/796,229

(22) Filed: Jul. 10, 2015

(65) Prior Publication Data
US 2017/0008428 A1    Jan. 12, 2017

(51) Int. Cl.
*B60N 2/01*    (2006.01)
*B60N 2/24*    (2006.01)
*A61G 3/08*    (2006.01)
*B60N 2/30*    (2006.01)

(52) U.S. Cl.
CPC ........... *B60N 2/242* (2013.01); *A61G 3/0808* (2013.01); *B60N 2/01* (2013.01); *B60N 2/245* (2013.01); *B60N 2/3047* (2013.01)

(58) Field of Classification Search
CPC .............................. B60N 2/242; A61G 3/0808
USPC ....... 410/7–11, 23, 51, 135, 140; 296/65.04, 296/64, 65.01, 67, 65.03; 297/232, 297/DIG. 4
See application file for complete search history.

(56) References Cited

U.S. PATENT DOCUMENTS

| | | | | |
|---|---|---|---|---|
| 4,103,934 A | * | 8/1978 | Arnholt | 410/7 |
| 4,221,396 A | * | 9/1980 | Kehl | 188/2 F |
| 4,369,995 A | * | 1/1983 | Harder, Jr. | 410/51 |
| 5,697,742 A | * | 12/1997 | House | B60P 7/15 410/121 |
| 7,455,490 B1 | * | 11/2008 | Goosen | A61G 3/0808 410/7 |
| 8,911,188 B1 | | 12/2014 | Mill | |

* cited by examiner

*Primary Examiner* — Stephen Gordon
(74) *Attorney, Agent, or Firm* — Davis & Bujold PLLC; Michael J. Bujold

(57) ABSTRACT

A seat assembly for a vehicle, in particular a public transport vehicle such as a bus or train, comprises a transversely positioned bench seat in front of which there is a wheelchair space. In front of the transversely positioned bench seat in the travel direction of the vehicle is arranged a barrier device comprising at least one barrier element and a rotation axis, about which the barrier element can be moved between a tilted-down position extending in front of the transversely positioned bench seat and a tilted-up position which leaves the wheelchair space free.

20 Claims, 6 Drawing Sheets

SEAT ASSEMBLY FOR A VEHICLE

BACKGROUND OF THE INVENTION

The invention concerns a seat assembly for a vehicle, in particular a public transport vehicle such as a bus or train, with a transversely positioned bench seat in front of which there is a space for a wheelchair.

Such a seat assembly is known from U.S. Pat. No. 8,911,188 B1. Whereas this seat assembly, which comprises a double folding seat and a retaining device for holding a wheelchair, is very effective for holding the wheelchair securely, there is a problem in that the utility of the double folding seat behind the wheelchair space when the said wheelchair space is not occupied by a wheelchair, is limited. When a wheelchair is in the wheelchair space, the said problem does not arise since the double folding seat cannot then be used.

The purpose of the present invention is to provide a seat assembly for a vehicle, in particular a public transport vehicle such as a bus or train, with which in the case when an existing wheelchair space is not being used, the transversely positioned bench seat assembly behind the wheelchair space can be used in an optimum way.

SUMMARY OF THE INVENTION

According to the invention, this objective is achieved by a seat assembly for a vehicle, in particular a public transport vehicle such as a bus or train, with a transversely positioned bench seat in front of which there is a wheelchair space, wherein, in front of the transversely positioned bench seat in the travel direction of the vehicle, a barrier device is provided, the barrier device having at least one barrier element and a rotation axis, such that the barrier element can be moved between a swiveled-out position in front of the transversely arranged bench seat and a swiveled-in position that leaves the wheelchair space free.

By virtue of the barrier device according to the invention, the transversely positioned bench seat behind the wheelchair space can be used normally since a passenger sitting on the bench seat can support himself against the barrier device if a sharp deceleration occurs, or can be held back thereby and will not be thrown forward over the free wheelchair space, where he could possibly be injured. The barrier device according to the invention also serves as extra support for the passenger if the vehicle is driving downhill.

The barrier element of the barrier device can be pivoted about a rotation axis between a swiveled-out and a swiveled-in, such that in the swiveled-out position the above-described protection of the passenger sitting on the transversely arranged bench seat is ensured, whereas in the swiveled-in position the wheelchair space is left free for use by a wheelchair.

The use both of the wheelchair space and also of the transversely positioned bench seat is simplified if the transversely positioned bench seat is a double folding seat.

In addition it can be provided that in its swiveled out position the barrier device only extends across part of the width of the double folding seat. This takes up less space and the risk of injury to passengers standing next to the barrier device in the case of an accident is reduced.

Safer retention of the passengers on the transversely positioned bench seat during a sharp deceleration of the vehicle is achieved if the at least one barrier element comprises a frame and a plate arranged in the frame.

When a longitudinally positioned bench seat is arranged in front of the transversely arranged bench seat in the travel direction, additional seated passengers can be transported.

In that case, if the longitudinally arranged bench seat is a double folding seat more free space is provided to the benefit of the wheelchair space, and on which a wheelchair can be arranged by tilting up the tilting seat.

To increase the rigidity of the barrier device, it can also be provided that the barrier device comprises a connection element to connect the rotation axis to a structural component of the vehicle.

A simple means for connecting the connection element to the said structural component of the vehicle is to bolt the connection element to the structural component of the vehicle.

In addition the rotation axis can be a distance from the connection element, and this makes it simpler to move the barrier element between its swiveled-out and its swiveled-in positions.

In order nevertheless to protect all the passengers sitting on the transversely positioned bench seat, a further barrier element can be provided between the connection element and the rotation axis.

To avoid rattling of the barrier element, in addition a locking device for locking the barrier element in its swiveled-out and/or in its swiveled-in position can be provided.

A simple movement of the barrier element between its swiveled-out and swiveled-in positions is possible if the locking device can be released by means of a release mechanism.

Below, the principle of an embodiment of the invention is illustrated with reference to the drawing.

BRIEF DESCRIPTION OF THE DRAWINGS

The figures show.

DESCRIPTION OF THE PREFERRED EMBODIMENT

Figure 1:
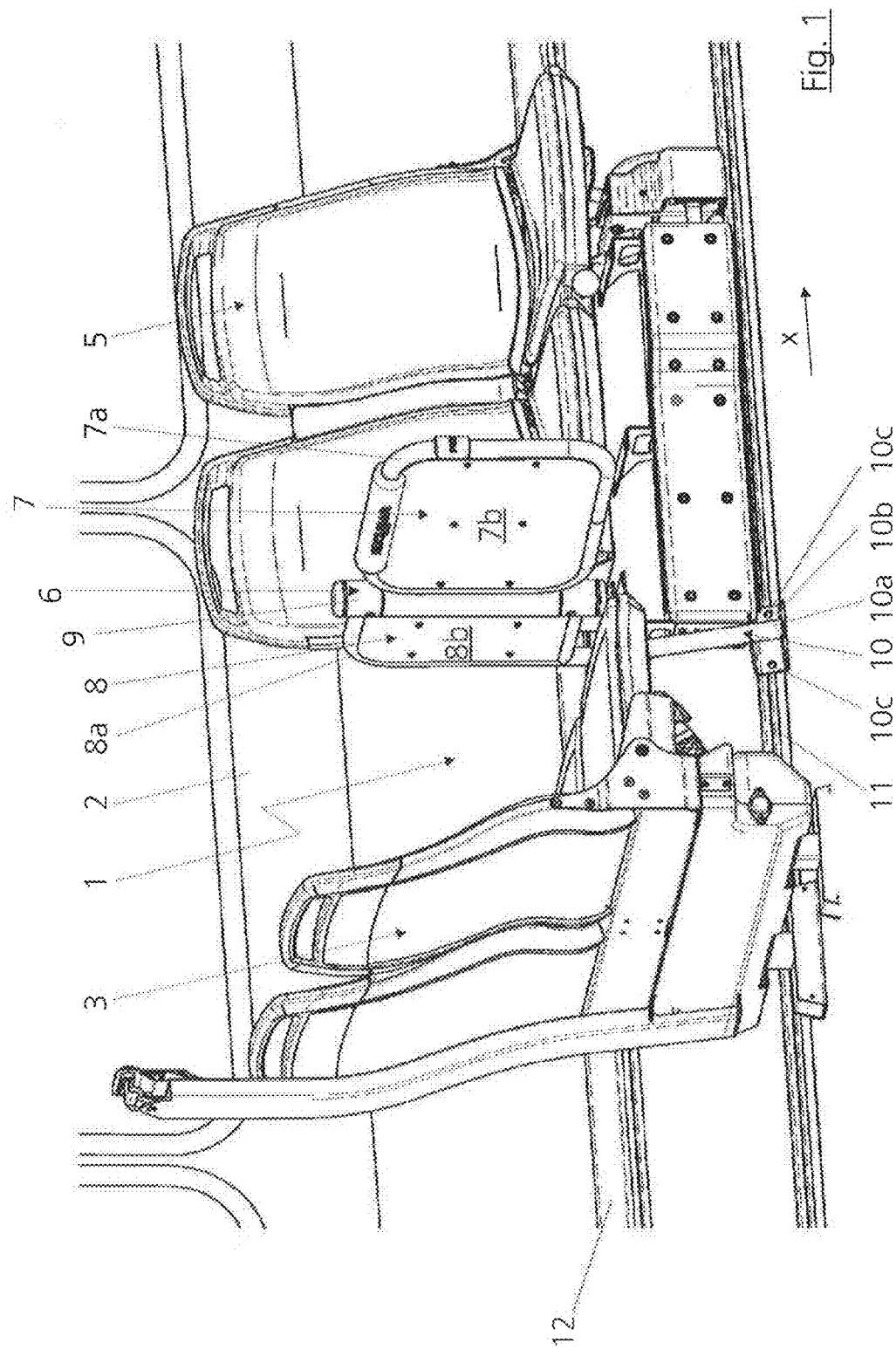
FIG. 1: A perspective view of a seat assembly according to the present invention.

FIG. 1 shows a seat assembly 1 for a vehicle (not shown as a whole), in particular a public transport vehicle such as a bus or train. Of the vehicle, in FIG. 1 and some other figures a sidewall 2 is shown.

Figure 5:
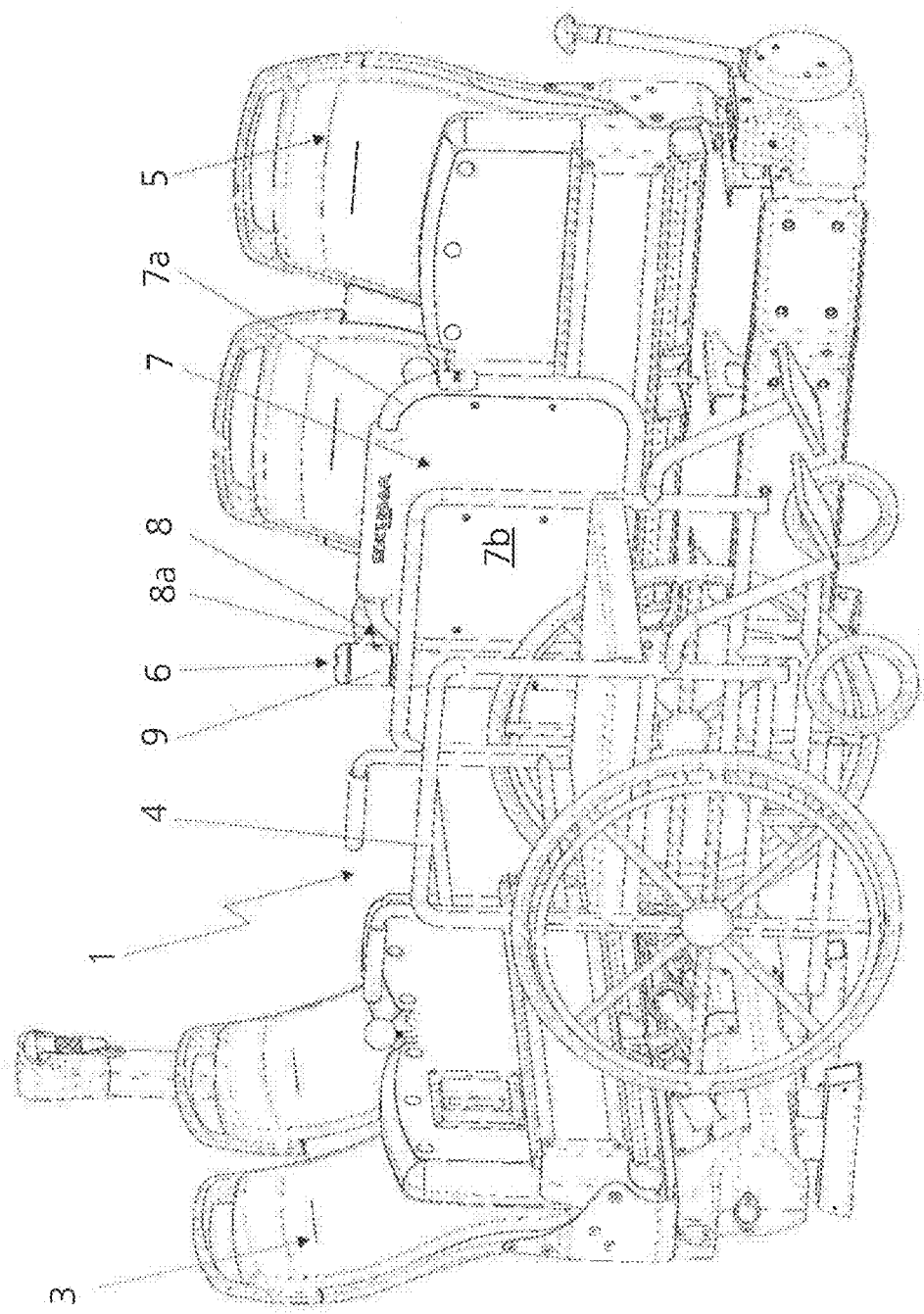
FIG. 5: The seat assembly of FIG. 4 with a wheelchair occupying the wheelchair space.

In the present case the seat assembly 1 comprises a bench seat 3 positioned transversely, i.e. across a travel direction of the vehicle denoted by the index "x", in front of which there is a wheelchair space. A wheelchair occupying the said wheelchair space is shown in FIG. 5 and is indexed 4. In addition the seat assembly in this case comprises a bench seat 5 arranged longitudinally in front of the transversely positioned bench seat 3, in the travel direction x of the vehicle, which in what follows will be called the longitudinal bench seat 5. Whereas the passengers (not shown) on the transversely positioned bench seat 3 face toward the travel direction x, the passengers sitting on the longitudinal bench seat 5 face transversely to the travel direction x.

Figure 2:
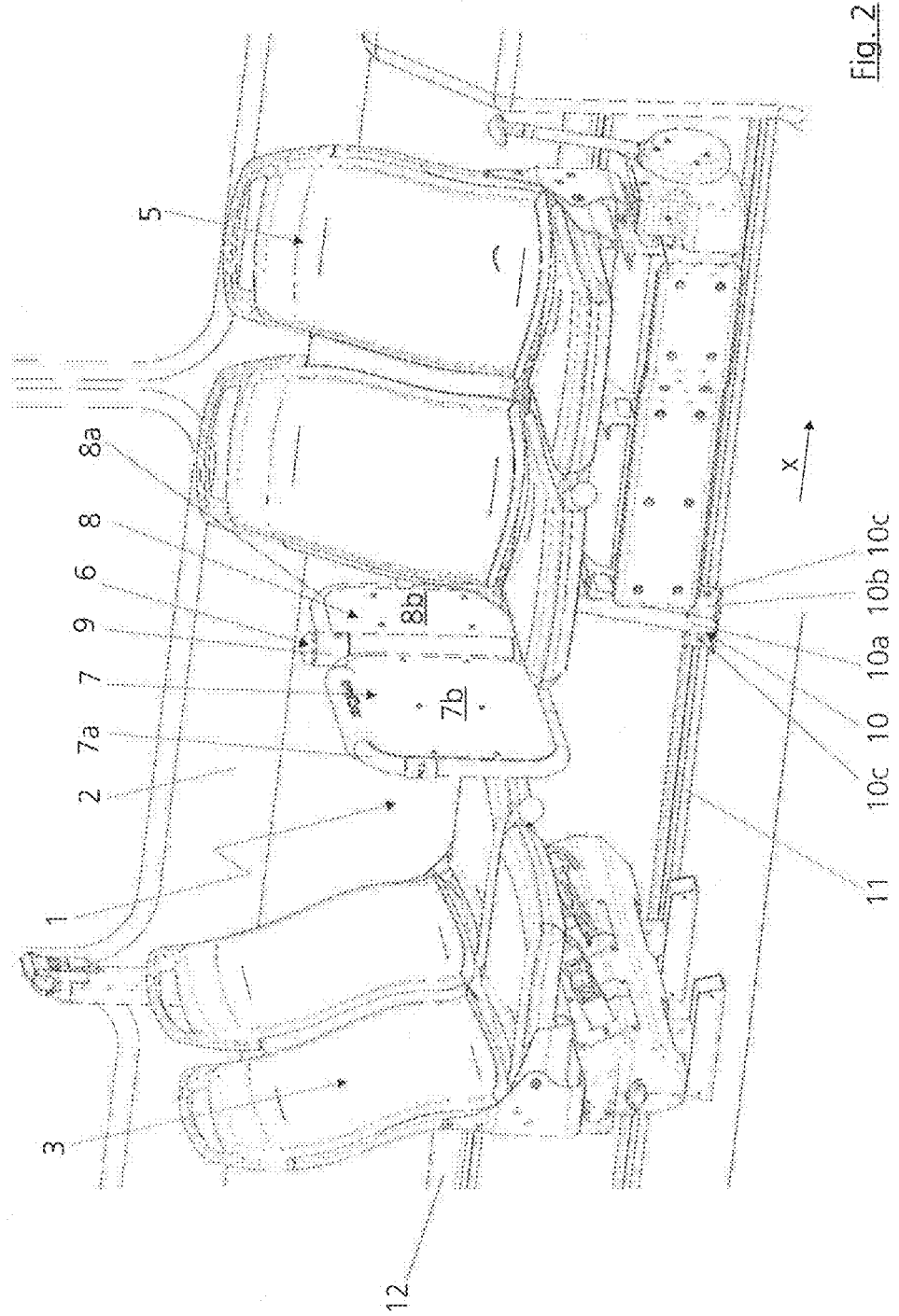
FIG. 2: Another perspective view of a seat assembly according to the present invention.

Particularly in FIG. 2 it can be seen that the transversely positioned bench seat 3 is in this case a double folding seat, i.e. a seat with two individually tilting seat surfaces. The longitudinal seat too is a double folding seat comprising two individual seat areas with tilting seat surfaces. The seat surfaces of the two seats, the transversely positioned bench seat 3 and longitudinally positioned bench seat 5 that form the double folding seats, are tilted upward in the conditions shown in FIGS. 3, 4 and 5, leaving free the wheelchair space in front of the transversely positioned bench seat 3 for the wheelchair 4.

In the travel direction x of the vehicle, in front of the transversely positioned bench seat 3 there is arranged a barrier device 6 which in the present case comprises two barrier elements 7 and 8 and also a rotation axis 9. The barrier elements 7 and 8 are arranged on either side of the rotation axis 9; in what follows, the barrier element facing away from the sidewall 2 will be called the outer barrier element 7 while the barrier element facing toward the sidewall 2 will be called the inner barrier element 8.

Figure 3:
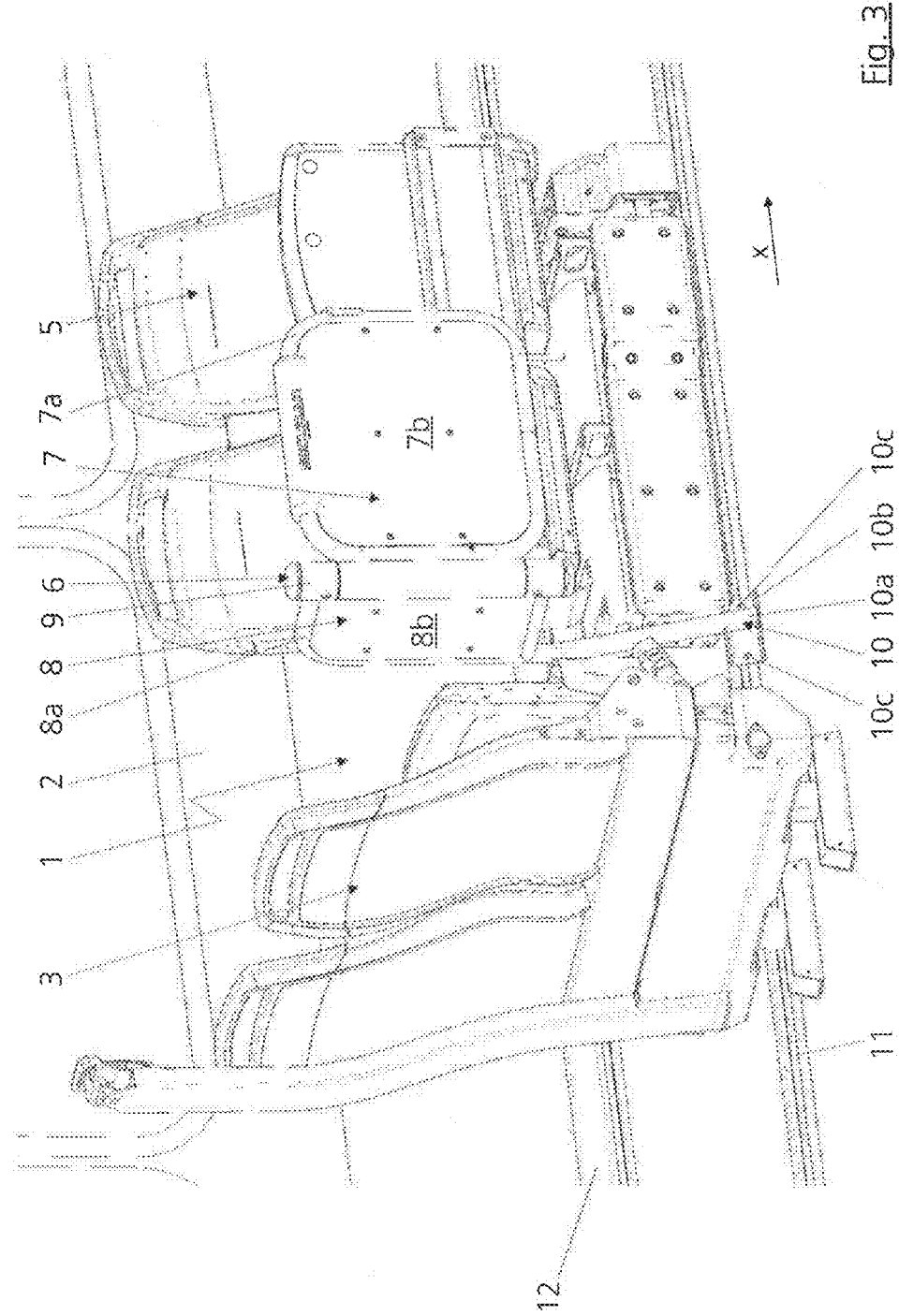
FIG. 3: The seat assembly of FIG. 1 with the barrier element in another position.
Figure 4:
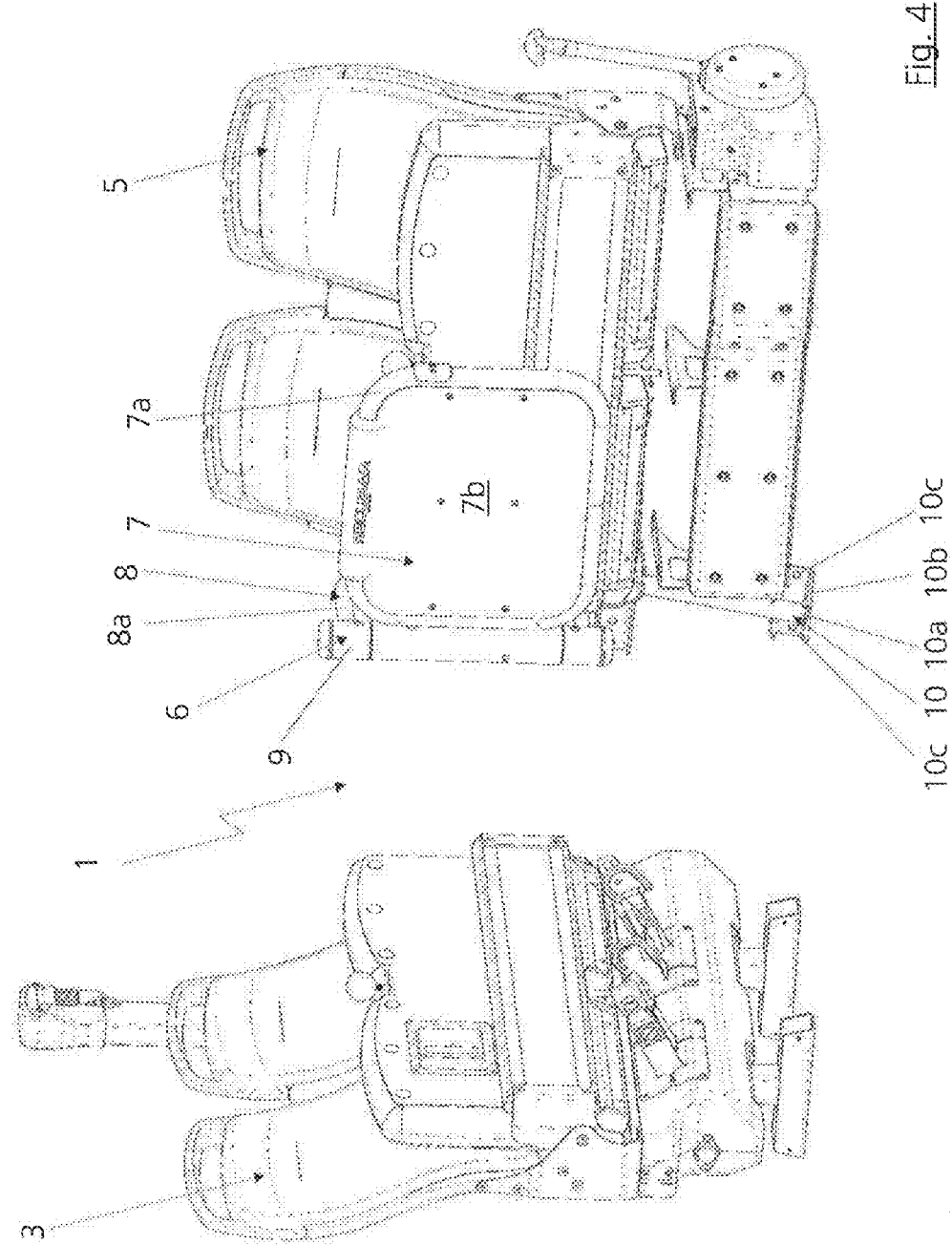
FIG. 4: A further view of the seat assembly with the barrier element in the position shown in FIG. 3.

The outer barrier element 7 can be moved between a swiveled-out position shown in FIGS. 1 and 2, in which it extends in front of the transversely positioned bench seat 3, and a swiveled-in position shown in FIGS. 3, 4 and 5, in which the said outer barrier element 7 is pivoted through approximately 90° relative to its swiveled-out position, leaving the wheelchair space in front of the transversely positioned bench seat 3 free. In addition, FIG. 2 shows that the barrier device 6 and in particular the outer barrier element 7 thereof, in its swiveled-out position, extends across only part of the width of the double folding seat.

Thus, by swiveling in the outer barrier element 7 a free space for receiving the wheelchair 4 is created on the wheelchair space, as shown in FIG. 5. On the other hand, the arrangement of the outer barrier element 7 in front of the transversely positioned bench seat 3 provides protection for any passengers sitting on the seat, since if a sharp deceleration of the vehicle occurs the passengers can support themselves against the barrier device 7. In particular, a passenger sitting on the longitudinal bench seat 5 can also support himself against the inner barrier element 8, for example if the vehicle accelerates sharply or if it is moving uphill.

To prevent misuse of the transverse bench seat 3, it can be provided that the two individually tilting seat surfaces thereof can only be tilted down to the horizontal position when the barrier element 7 is in front of the transverse bench seat 3, or that the barrier element 7 is moved to its swiveled-out position extending in front of the transverse bench seat 3 when the two individual tilting seat surfaces are moved to the horizontal position. In both cases, both a mechanical and also an electrical coupling of the barrier element 7 with the two seat surfaces of the transversely positioned bench seat 3 are conceivable. Furthermore, in the area of the transversely positioned bench seat 3 a notice can be posted to make it clear that when both seat surfaces of the transversely positioned bench seat 3 are in use, the barrier element 7 must be brought to its swiveled-out position extending in front of the transversely positioned bench seat 3. Obviously, the aforesaid also applies when only one of the two seat surfaces is brought to its horizontal position.

In the embodiment form illustrated, both the outer barrier element 7 and the inner barrier element 8 each have a frame 7a and 8a respectively, and preferably in each case two plates 7b and 8b arranged in the frames 7a, 8a parallel to one another. However, the plates 7b and 8b can also be omitted.

The barrier mechanism 6 comprises a connection element 10, which serves to connect the rotation axis 9 to a structural component of the vehicle and thus to hold or support the barrier mechanism 6 on the structure of the vehicle. In the present case the structural component of the vehicle is a rail 11 extending along the sidewall 2. In the present case the connection element 10 is bolted by bolts (not shown) to the structural component of the vehicle, i.e. to the said rail 11. For that purpose the connection element 10 comprises a bar 10a and a flange 10b attached to the bar 10a, which flange is provided with holes 10c through which the bolts (not shown) extend in order to attach the flange 10b and thus the connection element 10 to the rail 11. Above the rail 11 there extends a further rail 12, to which the two bench seats 3 and 5 are attached.

Figure 6:
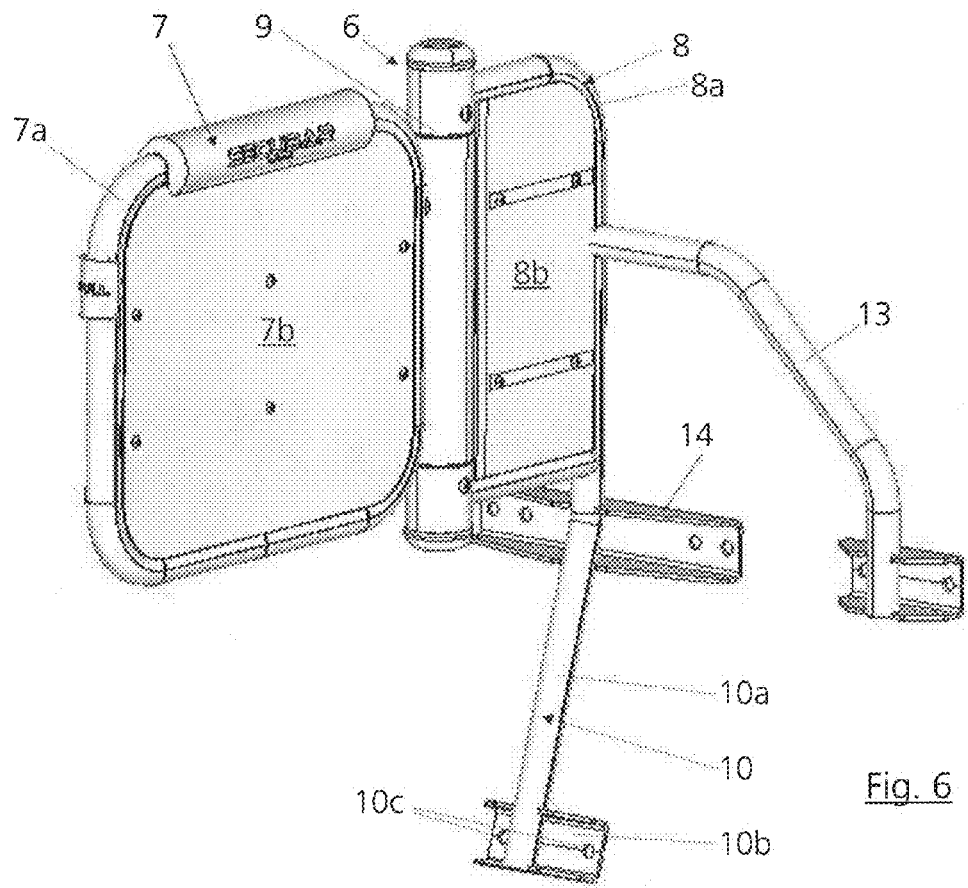
FIG. 6: An alternative embodiment of the barrier device according to the present invention.

In a manner not illustrated, it would also be possible to attach the connection element 10 to the transversely positioned bench seat 3 and/or to the longitudinal bench seat 5. An embodiment of the barrier mechanism 6, in which it has two further connection elements 13 and 14, is shown in FIG. 6. In this case the two connection elements 13 and 14 are attached to the upper rail 12 and can be fixed thereto in a manner similar to that of the connection element 10.

In the figures, especially FIGS. 1, 2 and 3, it can also be seen that the rotation axis 9 is a distance away from the connection element 10 and that the inner barrier element 8 is arranged between the connection element 10 and the rotation axis 9. However, it would also be possible to do without the inner barrier element 8. In such a case the rotation axis 9 could be attached directly to the connection element 10. As can be seen in FIGS. 3, 4 and 5, however, by virtue of the distance of the rotation axis 9 from the sidewall 2 the outer barrier element 7 can be swiveled in front of the tilted-up seat surfaces of the longitudinal bench seat 5.

Figure 7:
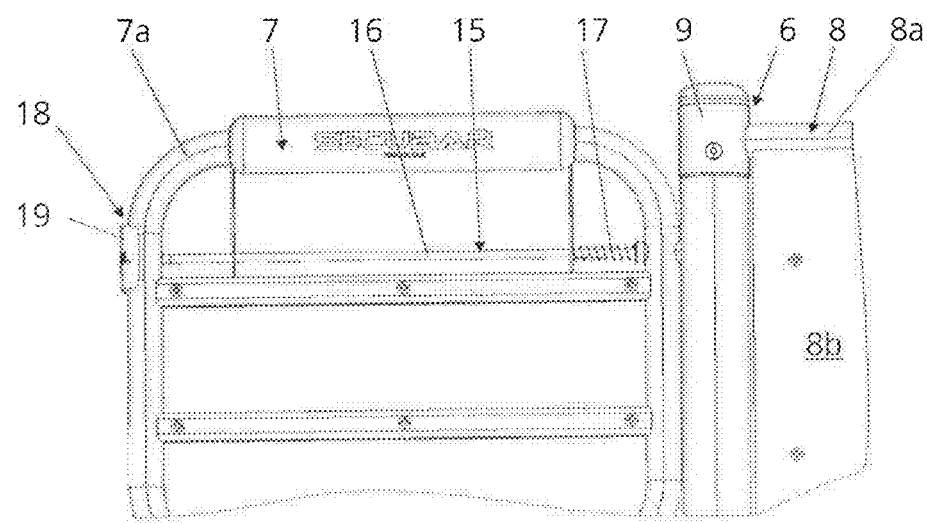
FIG. 7: The barrier device according to the present invention, with a locking device for locking the barrier element in its swiveled-out position and/or in its swiveled-in position.

FIG. 7 shows a locking device 15, which serves to lock the barrier element 7 in its swiveled-out position and in its swiveled-in position. The locking device 15 comprises a rod 16 which extends between the two plates 7b (not shown in this case) and engages in a bore (not shown) in the rotation axis 9. The rotation axis 9 has two such bores, so that the rod can lock the barrier element 7 to the rotation axis 9 both in the swiveled-out position and in the swiveled-in position, in order to prevent any movement of the barrier element 7. Furthermore, the locking device 15 comprises a spring element 17 that acts in the closing direction of the rod 16 and pushes it into the bore concerned when the rod 16 is aligned with the said bore. If necessary the locking device 15 could also be designed such that the barrier element 7 can be locked only either in its swiveled-out position or in its swiveled-in position.

FIG. 7 also shows a release mechanism 18, with which the locking device 15 can be released in order to enable the barrier element 7 to be pivoted. The release mechanism 18 comprises an actuation element 19 that acts upon the rod 16 or is connected thereto. By pulling the actuation element 19 the rod 16 is pulled out of the bore concerned against the force of the spring element 17, so that the locking of the barrier element 7 to the rotation axis 9 is released and the barrier element 7 can be moved between its swiveled-out position and its swiveled-in position. To then engage the rod 16 in the desired bore and thereby to lock the barrier element 7 to the rotation axis 9, it is only necessary to let go the actuation element 19.

The components of the barrier device 6, i.e. the outer barrier element 7, the inner barrier element 8, the rotation axis 9 and the connection element 10 and their individual parts can consist of a suitable plastic or a suitable metal. Of course, plastic can be used for certain individual parts and metal for others.

The invention claimed is:

1. A seat assembly for a public transport vehicle
the vehicle having a front, a back, and a length, where the length of the vehicle is defined as extending from the front of the vehicle to the back of the vehicle,
a first bench seat oriented perpendicular to the length of the vehicle facing to the front of the vehicle, and having an in-use position and a stowed position;
a wheelchair space located between the first bench seat and the front of the vehicle, and
a barrier device situated immediately adjacent to the first bench seat and located between the wheelchair space and the first bench seat along the length of the vehicle, the barrier device comprising at least one barrier element, and the barrier device having a rotation element about which the at least one barrier element can be moved between a swiveled-out position, to extend the barrier element parallel with and in front of the first bench seat, and a swiveled-in position which provides a free space for accommodating a wheelchair in the wheelchair space when the bench seat is in a stowed position.

2. The seat assembly according to claim 1, wherein the first bench seat is a double folding seat.

3. The seat assembly according to claim 2, wherein, when the barrier element is in the swivelled-out position, the barrier device is arranged in front of only part of a width of the double folding seat.

4. The seat assembly according to claim 1, wherein the at least one barrier element comprises a frame and a plate arranged in the frame.

5. The seat assembly according to claim 1, wherein in front of the first bench seat along the length of the vehicle, there is a second bench seat arranged parallel with the length of the vehicle and perpendicular to the first bench seat, the second bench seat having an in-use and a stowed position.

6. The seat assembly according to claim 5, wherein the second bench seat is a double folding seat.

7. The seat assembly according to claim 1, wherein the barrier device comprises a connection element for connecting the rotation element to a structural component of the vehicle.

8. The seat assembly according to claim 7, wherein the connection element is bolted onto the structural component of the vehicle.

9. The seat assembly according to claim 7, wherein the rotation element is spaced away from the connection element.

10. The seat assembly according to claim 9, wherein a further barrier element is provided between the connection element and the rotation element.

11. The seat assembly according to claim 1, with a locking device for locking the at least one barrier element in the swiveled-out position and/or in the swiveled-in position.

12. The seat assembly according to claim 11, wherein the locking device is released by a release device.

13. A seat assembly for a public transit vehicle comprising:

the vehicle having a front, a back, and a length, where the length of the vehicle is defined as extending from the front of the vehicle to the back of the vehicle;
a first folding bench seat oriented perpendicular to the length of the vehicle, facing toward the front of the vehicle, having an in-use position and a stowed position;
a space for accommodating a wheelchair located between the first folding bench seat and the front of the vehicle, which is configured to accommodate and transport a person seated in a wheelchair; and
a barrier device situated immediately adjacent to the first folding bench seat and located between the wheelchair space and the first folding bench seat along the length of the vehicle, and the barrier device being movable between a swivelled-out position and a swivelled-in position about rotation element;
when the first folding bench seat is in the in-use position, the barrier device extends parallel to and in front of the first folding bench seat to provide a passenger with an extra support, and
when the first folding bench seat is in the stowed position and the barrier device is in the swivelled-in position, the barrier device being perpendicular to the first folding bench seat thereby providing space free for use in transporting a person in the wheelchair.

14. The seat assembly according to claim 13, wherein the first bench seat is a double folding seat.

15. The seat assembly according to claim 14, wherein the barrier device has at least one barrier element comprising a frame and a plate arranged in the frame, and when in the swivelled-out position, the barrier device is arranged in front of only part of a width of the double folding seat.

16. The seat assembly according to claim 13, wherein a second bench seat arranged parallel with the length of the vehicle and perpendicular to the first folding bench seat, the second bench seat having an in-use and a stowed position.

17. The seat assembly according to claim 16, wherein the second bench seat is a double folding seat, and the barrier device comprises a connection element for connecting the rotation element to a structural component of the vehicle.

18. The seat assembly according to claim 17, wherein the connection element is bolted onto the structural component of the vehicle, and the rotation element is spaced away from the connection element.

19. The seat assembly according to claim 18, wherein a further barrier element is provided between the connection element and the rotation element,
a locking device is provided for locking the barrier element in the swivelled-out position and/or in the swivelled-in position, and
the locking device is released by a release device.

20. A seat assembly for a public transit vehicle comprising:
the vehicle having a front, a back, and a length, where the length of the vehicle is defined as extending from the front of the vehicle to the back of the vehicle;
a first folding bench seat oriented perpendicular to the length of the vehicle, facing to the front of the vehicle, having an in-use position and a stowed position and a second bench seat arranged parallel with the length of the vehicle and perpendicular the first folding bench seat, the second bench seat having an in-use and a stowed position;
a space for accommodating a wheel chair located between the first folding bench seat and the front of the vehicle and adjacent to the second bench seat which is configured to accommodate and transport a person seated in a wheelchair; and a barrier device situated immediately adjacent to the first folding bench seat and located between the wheelchair space and the first folding bench seat along the length of the vehicle, and the barrier device being movable between a swivelled-out position and a swivelled-in position about a rotation element;

when the first folding bench is in the in-use position, the barrier device extends parallel to and in front of the first folding bench seat and perpendicular to the second bench seat to provide a passenger riding in the first folding bench seat with an extra support; and when the first folding bench is in the stowed position and the barrier device is in the swivelled-in position, the barrier device being parallel with the length of the vehicle and located between the wheelchair space and the second bench seat, the second bench seat being in the stowed position, thereby providing space free for use in transporting a person in the wheelchair.

\* \* \* \* \*